United States Patent [19]

Egawa et al.

[11] Patent Number: 4,603,954
[45] Date of Patent: Aug. 5, 1986

[54] SYNCHRONIZING DEVICE FOR FLASH PHOTOGRAPHY

[75] Inventors: Akira Egawa; Takanori Kodaira, both of Tokyo, Japan

[73] Assignee: Canon Kabushiki Kaisha, Tokyo, Japan

[21] Appl. No.: 683,400

[22] Filed: Dec. 19, 1984

[30] Foreign Application Priority Data

Dec. 22, 1983 [JP] Japan .................... 58-242679
Dec. 29, 1983 [JP] Japan .................... 58-250263
Dec. 29, 1983 [JP] Japan .................... 58-250266

[51] Int. Cl.$^4$ ............................................. G03B 15/05
[52] U.S. Cl. .................................................. 354/137
[58] Field of Search ............... 354/421, 21, 458, 137, 354/145.1, 413

[56] References Cited

U.S. PATENT DOCUMENTS

| 3,742,828 | 7/1973 | Nakajima et al. ............... 354/421 |
| 4,139,289 | 2/1979 | Yamada et al. ............... 354/458 X |
| 4,285,585 | 8/1981 | Numata ............................ 354/421 X |
| 4,317,624 | 3/1982 | Shenk ............................... 354/401 X |

Primary Examiner—William B. Perkey
Attorney, Agent, or Firm—Toren, McGeady, Stanger, Goldberg & Kiel

[57] ABSTRACT

The object distance from a range finder is factored into the guide number of the strobe to obtain an aperture value in binary form by a decoder. As the size of aperture opening of the shutter is increasing from the minimum to the maximum, a counter counts up a corresponding number of pulses in addition to the preset value of film speed. The output of the counter is compared with the output of the decoder by a comparator upon coincidence to produce an actuating signal for the strobe.

8 Claims, 29 Drawing Figures

FIG. 7(a)

| FILM SENSITIVITY (ISO) | OUTPUT OF FILM SENSITIVITY INPUT CKT 3 |
|---|---|
| 25 | 0000 |
| 50 | 0010 |
| 100 | 0100 |
| 200 | 0110 |
| 400 | 1000 |
| 800 | 1010 |

FIG. 7(b)

| APERTURE VALUE | OUTPUT OF APERTURE PULSE OUTPUT CKT 2 |
|---|---|
| CS | 0001 |
| 16 | 0010 |
| 13 | 0011 |
| 11 | 0100 |
| 9.4 | 0101 |
| 8 | 0110 |
| 6.7 | 0111 |
| 5.6 | 1000 |
| 4.7 | 1001 |
| 4 | 1010 |
| 3.3 | 1011 |
| 2.8 | 1100 |

F I G. 7(c)

| OUTPUT OF RANGE FINDER 5 | ACTUAL DISTANCE | APERTURE VALUE (FOR GNO.10 & ISO 100) | BINARY EQUIVALENT | OUTPUT OF DECODER 6 (WITH CORRECTION OF 00011) |
|---|---|---|---|---|
| 0001 | 8m | 1.2 | 10001 | 10100 |
| 0010 | 3.2 | 3.3 | 01011 | 01110 |
| 0011 | 2 | 4.7 | 01001 | 01100 |
| 0100 | 1.5 | 6.7 | 00111 | 01010 |
| 0101 | 1.2 | 8 | 00110 | 01001 |
| 0110 | 1.0 | 9.4 | 00101 | 01000 |
| 0111 | 0.8 | 11 | 00100 | 00111 |
| 1000 | 0.7 | 13 | 00011 | 00110 |
| 1001 | 0.65 | 16 | 00010 | 00101 |
| 1010 | 0.6 | 16 | 00010 | 00101 |

FIG.9(a)

| FILM SENSITIVITY (ISO) | Q4e | Q4d | Q4c | Q4b | Q4a |
|---|---|---|---|---|---|
| 25 | 0 | 0 | 0 | 0 | 0 |
| 50 | 0 | 0 | 0 | 1 | 0 |
| 100 | 0 | 0 | 1 | 0 | 0 |
| 200 | 0 | 0 | 1 | 1 | 0 |
| 400 | 0 | 1 | 0 | 0 | 0 |
| 800 | 0 | 1 | 0 | 1 | 0 |

FIG.9(b)

| APERTURE VALUE | OUTPUT OF APERTURE DETECTOR CKT 119 IN TOTAL NUMBER OF PULSES | | | | |
|---|---|---|---|---|---|
| 16 | 0 | 0 | 0 | 0 | 1 |
| 13.3 | 0 | 0 | 0 | 1 | 0 |
| 11 | 0 | 0 | 0 | 1 | 1 |
| 9.4 | 0 | 0 | 1 | 0 | 0 |
| 8 | 0 | 0 | 1 | 0 | 1 |
| 6.7 | 0 | 0 | 1 | 1 | 0 |
| 5.6 | 0 | 0 | 1 | 1 | 1 |
| 4.7 | 0 | 1 | 0 | 0 | 0 |
| 4 | 0 | 1 | 0 | 0 | 1 |
| 3.3 | 0 | 1 | 0 | 1 | 0 |
| 2.6 | 0 | 1 | 0 | 1 | 1 |

F I G.9(c)

| OUTPUT OF PHOTOGRAPHIC DISTANCE INFORMATION GENERATING CKT 101 | OUTPUT OF DECODER 102 (REFERENCE LEVEL) | | | | ACTUAL DISTANCE (m) |
|---|---|---|---|---|---|
| 0001 | 1 | 0 | 1 | 0 | 8.0 |
| 0010 | 0 | 1 | 1 | 0 | 3.2 |
| 0011 | 0 | 1 | 0 | 0 | 2.0 |
| 0100 | 0 | 1 | 1 | 0 | 1.5 |
| 0101 | 0 | 0 | 1 | 0 | 1.2 |
| 0110 | 0 | 1 | 0 | 1 | 1.0 |
| 0111 | 0 | 0 | 1 | 1 | 0.85 |
| 1000 | 0 | 0 | 1 | 0 | 0.75 |
| 1001 | 0 | 0 | 1 | 1 | 0.65 |
| 1010 | 0 | 1 | 0 | 1 | 0.60 |

FIG.14A

| FILM SENSITIVITY (IN ISO) | | BINARY CODE | | | | |
|---|---|---|---|---|---|---|
| DECIMAL REPRESENTATION | BINARY EQUIVALENT | 4 | 2 | 1 | 2/3 | 1/3 |
| ※ 25 | $25 \times 2^{0}{}_{\frac{1}{3}}$ | | | | | |
| 32 | $25 \times 2^{\frac{1}{3}}$ | | | | | ○ |
| 40 | $25 \times 2^{\frac{2}{3}}$ | | | | ○ | |
| ※ 50 | $25 \times 2^{1}{}_{\frac{1}{3}}$ | | | ○ | | |
| 64 | $25 \times 2^{1\frac{1}{3}}$ | | | ○ | | ○ |
| 80 | $25 \times 2^{1\frac{2}{3}}$ | | | ○ | ○ | |
| ※ 100 | $25 \times 2^{2}{}_{\frac{1}{3}}$ | | ○ | | | |
| 125 | $25 \times 2^{2\frac{1}{3}}$ | | ○ | | | ○ |
| 160 | $25 \times 2^{2\frac{2}{3}}$ | | ○ | | ○ | |
| ※ 200 | $25 \times 2^{3}{}_{\frac{1}{3}}$ | | ○ | ○ | | |
| 250 | $25 \times 2^{3\frac{1}{3}}$ | | ○ | ○ | | ○ |
| 320 | $25 \times 2^{3\frac{2}{3}}$ | | ○ | ○ | ○ | |
| ※ 400 | $25 \times 2^{4}{}_{\frac{1}{3}}$ | ○ | | | | |
| 500 | $25 \times 2^{4\frac{1}{3}}$ | ○ | | | | ○ |
| 640 | $25 \times 2^{4\frac{2}{3}}$ | ○ | | | ○ | |
| ※ 800 | $25 \times 2^{5}{}_{\frac{1}{3}}$ | ○ | | ○ | | |
| 1000 | $25 \times 2^{5\frac{1}{3}}$ | ○ | | ○ | | ○ |
| 1250 | $25 \times 2^{5\frac{2}{3}}$ | ○ | | ○ | ○ | |
| ※ 1600 | $25 \times 2^{6}{}_{\frac{1}{3}}$ | ○ | ○ | | | |
| 2000 | $25 \times 2^{6\frac{1}{3}}$ | ○ | ○ | | | ○ |
| 2500 | $25 \times 2^{6\frac{2}{3}}$ | ○ | ○ | | ○ | |
| ※ 3200 | $25 \times 2^{7}{}_{\frac{1}{3}}$ | ○ | ○ | ○ | | |
| 4000 | $25 \times 2^{7\frac{1}{3}}$ | ○ | ○ | ○ | | ○ |
| 5000 | $25 \times 2^{7\frac{2}{3}}$ | ○ | ○ | ○ | ○ | |

FIG. 14B(a)

| ISO VALUE | Q53 | Q54 | Q55 | Q56 | Q57 |
|---|---|---|---|---|---|
| 1 | 0 | 0 | 0 | 0 | 0 |
| 25 | 0 | 0 | 0 | 1 | 0 |
| 500 | 0 | 0 | 1 | 0 | 0 |
| 1000 | 0 | 0 | 1 | 1 | 0 |
| 2000 | 0 | 1 | 0 | 0 | 0 |
| 400 | 0 | 1 | 0 | 1 | 0 |
| 800 | 0 | 1 | 1 | 1 | 0 |

FIG. 14B(b)

| APERTURE VALUE | Q54 | Q55 | Q56 | Q57 |
|---|---|---|---|---|
| 16 | | 1 | 1 | 1 |
| 13.3 | | 1 | 1 | 0 |
| 11 | | 1 | 0 | 1 |
| 9.4 | | 0 | 0 | 0 |
| 8 | | 0 | 1 | 1 |
| 6.7 | 1 | 0 | 1 | 0 |
| 5.6 | 1 | 0 | 0 | 1 |
| 4.7 | 1 | 0 | 0 | 0 |
| 4 | 1 | 0 | 1 | 1 |
| 3.3 | | | 1 | 1 |
| 2.8 | | | 1 | 0 |

FIG. 14B(c)

| DISTANCE | Q53 | Q54 | Q55 | Q56 | Q57 | |
|---|---|---|---|---|---|---|
| 0 | 1 | 0 | 1 | 0 | 0 | 8.0 |
| 0 | 0 | 1 | 1 | 0 | 0 | 3.2 |
| 1 | 0 | 1 | 0 | 1 | 0 | 2.0 |
| 0 | 0 | 1 | 1 | 0 | 1 | 1.5 |
| 1 | 0 | 1 | 0 | 0 | 0 | 1.2 |
| 0 | 0 | 1 | 0 | 1 | 1 | 1.0 |
| 1 | 0 | 0 | 1 | 1 | 0 | 0.85 |
| 1 | 0 | 0 | 1 | 0 | 1 | 0.75 |
| 0 | 0 | 0 | 1 | 0 | 1 | 0.65 |
| 1 | 0 | 0 | 1 | 0 | 1 | 0.60 |

SYNCHRONIZING DEVICE FOR FLASH PHOTOGRAPHY

BACKGROUND OF THE INVENTION

1. Field of the Invention

This invention relates to apparatus for synchronizing the flash lighting with the camera shutter.

2. Description of the Prior Art

As the conventional example of the strobe synchronizing method, there has been known Japanese Laid-Open Patent Application No. SHO 58-42033 in which, as shown in FIG. 1, a range finder 51 with a counter produces an output in digital form which is then factored into the guide number of a strobe 58 by a decoder 52 to determine the required value of aperture. This value is set in a DOWN counter 53. The sensitivity of the used film is set in an input device 54. Counting down the output of the input device 54, the DOWN counter 53 produces an output as a reference level for a comparator 57. As the shutter is opening, an aperture detector 56 produces a corresponding number of pulses to the actual size of aperture opening of the shutter which are applied to an UP counter 55. When the output of the UP counter 55 exceeds the output of the DOWN counter 53, a comparator 57 produces an actuating signal for firing the strobe 58. Thus, a proper flash exposure is made. In this method, however, there is need to use two counters, and, moreover, one of them is the DOWN counter. Therefore, the electrical circuit is increased in scale and becomes complicated in structure. This calls for an increase in the production cost. Another disadvantage is that the manufacturing techniques and the maintenance becomes very difficult.

In the art of lens shutter cameras, the photographic lenses have generally as short focal lengths as 28 to 40 mm. To take an image of a subject of principal photographic interest in large proportion, therefore, the camera has to approach so much near to the subject. For this reason, a camera having two focal lengths, or the standard and telephoto settings has come into the market. As a result, though the aforementioned drawback has been removed, the conventional strobe flash-camera shutter synchronizing apparatus shown in FIG. 1 can no longer be employed in such focal length changeable camera, because the output of the aperture detector does not correspond to one and the same aperture value when the focal length is changed over between two different values, for, as the diameter of the entrance pupil of the photographic lens remains constant, the change of the focal length results in a change of the aperture value at the full opening.

As the technique of speeding up the sensitivity of film advances, the amount of flash light the ordinary strobe usually emits becomes so large that with the near subject, even when the aperture opening is of the smallest size, an over-exposure results. To avoid this, the amount of flash light of the strobe may be made variable stepwise in accordance with the film speed or the object distance. In this case, however, it also follows that the aforementioned conventional synchronizing method can no longer be used. Further, there is another photographic situation where the photographer desires to alter the flash exposure value according to his experience and insight, for example, when a special filter is used with the result of reduction of the intensity of flash light, or when the flash illumination is brought into good balance with the ambient light. In these cases, too, the aforementioned conventional synchronizing method becomes out of use, because the value of the correction factor for use in computing the aperture value for flash exposure must be changed.

SUMMARY OF THE INVENTION

An object of the present invention is to eliminate the above-described problems and to provide an apparatus for synchronizing a flash lighting with a size of the increasing aperture opening of a camera shutter, in which, to determine the size, a common counter is used for computing the film sensitivity information and the aperture size dependent number of pulses, thereby the scale of the electrical circuit is reduced and its constructional structure is simplified, while still making possible the accurate and reliable synchronization when in flash photography.

Another object is to provide for such apparatus with means manually rendering it possible to alter the value of the correction factor for determination of the size of aperture opening so that even when a photographic condition is changed, a correct flash exposure can be made.

Still another object is to provide a low-cost circuit receptive of a digital-coded signal from the film cartridge for producing an output in both of analog and digital forms.

Other objects of the invention will become apparent from the following description of embodiments thereof.

BRIEF DESCRIPTION OF THE DRAWINGS

FIGS. 7(a) to 7(c) are truth tables for the values of the exposure factors used in the apparatus of FIG. 2.

FIGS. 9(a) to 9(c) are truth tables for the information bits of FIG. 8.

FIGS. 14A and 14B(a) to 14B(c) are truth tables for the information bits in the circuit of FIG. 13.

DESCRIPTION OF THE PREFERRED EMBODIMENTS

The present invention will next be described in connection with embodiments thereof by reference to the drawings.

Figure 1:
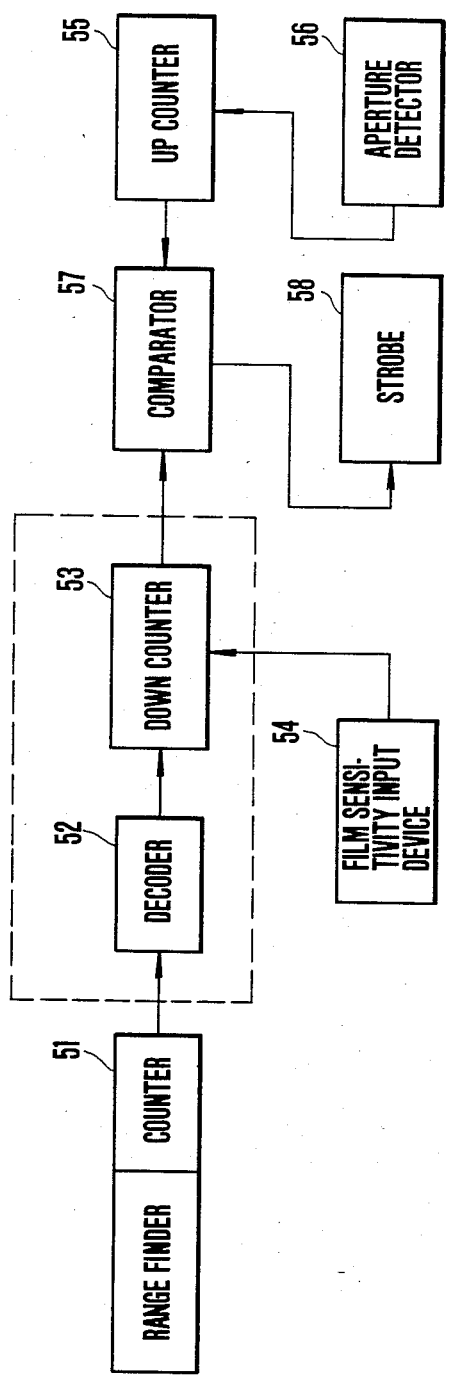
FIG. 1 is a signal flow chart of the conventional synchronizing apparatus.
Figure 2:
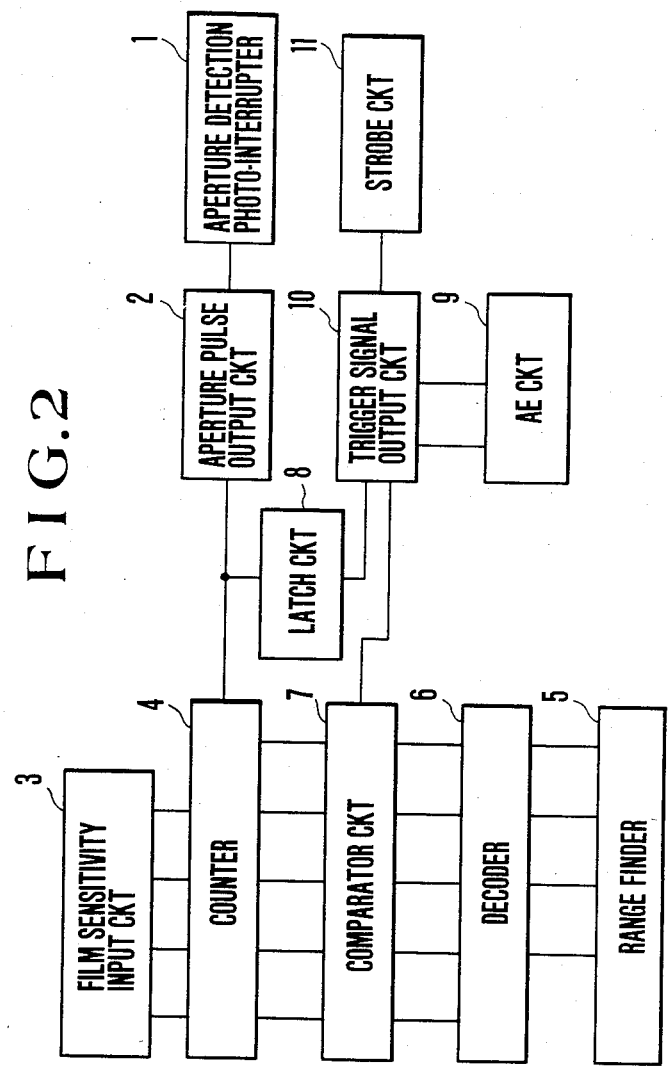
FIG. 2 is a block diagram of an embodiment of a flash lighting-shooting synchronizing apparatus according to the present invention.

In FIG. 2 there is shown an embodiment of the synchronizing apparatus according to the present invention where a photo-interrupter 1 is arranged adjacent a row of slits formed in one of two blades of an aperture-cum-shutter to produce pulses for detection of aperture values when the shutter blades are opening. Responsive to the output of the photo-interrupter 1, an aperture pulse output circuit 2 produces one pulse for every half aperture stop. The sensitivity of the used film is detected by a film sensitivity input circuit 3 in the form of four information bits, as the film cartridge has four codes on the surface thereof usable as switch means. The film sensitivity information from the input circuit 4 is then set in a 5-bit binary counter 4. This counter 4 counts up the number of pulses from the output circuit in addition to the film sensitivity information.

A range finder 5 capable of preliminary measurement of the object distance has a 4-bit counter for storing the measured value of the distance in digital form. The shorter the object distance, the larger the magnitude of the output of that counter becomes. A decoder 6 receptive of four information bits from the range finder 5 produces an output representative of the sum of an aperture value obtained by dividing the guide number of the strobe by the object distance, plus that value of film sensitivity which is assigned to the guide number, and, in this instance, minus one (for, as this output is used as a reference level for comparison with the output of the counter 4, it is not when the latter is equal to the former, but when larger by one, that a comparator circuit 7 changes its output to high (H) level) in 5-bit binary coded decimal form. A latch circuit 8 responsive to the second pulse from the circuit 2 (which represents the minimum discrete size of aperture opening, or the maximum aperture value "16" in FIG. 7(b)) changes its output to H level, as the first pulse from the circuit 2 has been latched therein. For note, this or first pulse is not related to the aperture detection and only serves as a count start pulse CS when a count switch is turned on from a position where an auxiliary diaphragm is closed, as will be described later. An automatic exposure control circuit 9 (hereinafter abbreviated to "AE" circuit) known to those skilled in the art changes its output to H level either at the termination of duration of the exposure time before the shutter is fully opened, or in a prescribed time after the shutter has been fully opened.

A trigger signal output circuit 10 receptive of the outputs of the comparator circuit 7, latch circuit 8, and AE circuit 9 produces a triggering signal in proper timed relationship to the start of opening of the shutter. In more detail, the triggering pulse is produced at a point in time, either as the output of the latch circuit 8 is of H level, when the output of the comparator circuit 7 changes to H level, or vice versa, or as the output of the comparator circuit 7 is of L level, when the AE circuit 9 changes its output to H level representing either the termination of the exposure, or the shutter cut off time. A strobe circuit 11 known to those skilled in the art responsive to the triggering signal fires a flash lamp.

The operation of the apparatus of such construction is as follows: When a release button (not shown) is pushed down by the photographer, a sequence of operations of the camera starts. At first, the range finder 5 is rendered operative, and the measured value of the object distance is set in a counter (not shown) within the range finder. It is to be noted that the output of the range finder is used not only for computing a flash exposure value, but also for automatic focusing adjustment of the photographic lens (not shown). Then, by the decoder 6, the value of the object distance is factored into the given guide number specific to the strobe, and the obtained aperture value is corrected by the standard value of the film sensitivity so that the strobe will be fired in accurate timing by the comparator circuit 7.

Figure 5:
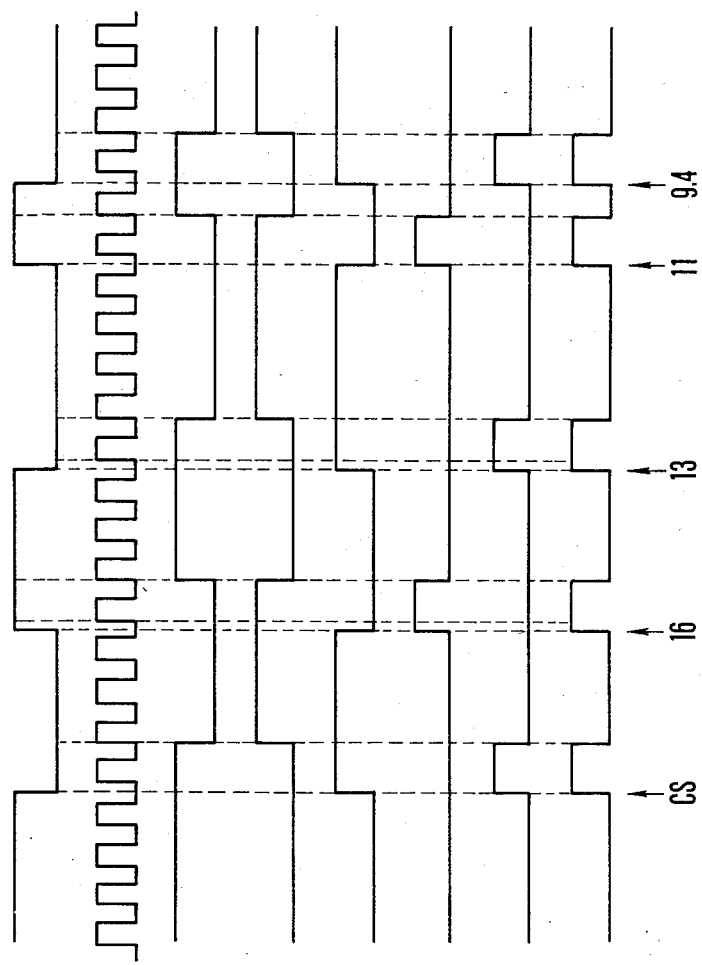
FIGS. 5(a) to 5(h) are a pulse timing chart of the circuit of FIG. 4.

Meanwhile, the preset value of film sensitivity is transferred from the input circuit 3 to the counter 4. Then, to initiate an exposure, the shutter starts to open. As the slits in the shutter blade move successively past the photo-sensitive surface of the photo-interrupter 1, the number of pulses equal to the number of slits passed across the photo-interrupter 1 are produced as shown in FIG. 5(a). For every one of the leading and trailing edges of each of these pulses, the aperture pulse output circuit 2 produces one pulse representing one of the half step-incremented aperture values as shown in FIG. 5(h). An ever-increasing number of aperture pulses are counted up by the counter 4. When the output of the counter 4 exceeds the output of the decoder 6, the comparator circuit 7 changes its output to H level. This output is applied to the trigger signal output circuit 10.

Notice here that the outputs of the latch circuit 8 and AE circuit 9 are also given to the trigger signal output circuit 10. If the change of the output of the AE circuit 9 to H level representing the termination of the exposure takes place earlier than the change of the output of the comparator circuit 7 to H level, therefore, lest an overexposure result, the trigger signal output circuit 10 causes the strobe circuit 11. Soon after that, the shutter is closed.

In other situations, to allow for electric flash auto, the moment at which the output circuit 10 produces the triggering pulse coincides with that at which the comparator circuit 7 changes its output to H level. In this case, however, it is required that the shutter is already opened to at least the minimum size (corresponding to the maximum aperture value) as detected by the photo-interrupter 1, and, therefore, that the pulse representing the maximum aperture value from the circuit 2 has been latched in the latch circuit 8 so that the output of the latch circuit 8 is of H level.

But, there is a possibility of occurrence of the H-level output of the comparator circuit 7 just before the shutter opens to the minimum size of aperture, when the sensitivity of the used film is very high and the distance from the camera to the subject is very short. In this case, therefore, as the minimum size of aperture is not yet detected by the photo-interrupter 1, the output of the latch circuit 8 remains at L level, preventing the trigger signal output circuit 10 from producing the trigger pulse in response to the H level output of the comparator circuit 7. Then, when the aperture pulse output circuit 2 produces the second pulse representing the minimum size of aperture opening, the output of the latch circuit 8 changes to H level. Responsive to this, the trigger signal output circuit 10 gives the trigger pulse to the strobe circuit 11. After the flash lighting occurs at the minimum size of aperture opening of the shutter, the shutter is immediately closed.

Alternatively assuming that the sensitivity of the used film is very low and the subject distance is very long, then the output of the decoder 6 is so high that even when all the pulses available from the photo-interrupter 1 through the aperture pulse output circuit 2 have been produced, in other words, when the shutter has been fully opened, the comparator circuit 7 does not produce the H level output. In this case, after the prescribed time has elapsed, when the AE circuit 9 changes its output to H level representing the termination of the period of actuation of the shutter. Responsive to this, the trigger signal output circuit 10 produces the trigger pulse. Therefore, the strobe is fired at the full open aperture of the shutter. After that, the shutter is closed.

Instead of using such shutter-deactuating signal, another latch circuit may be used as arranged to produce an output of H level when the aperture opening of the shutter reaches the maximum size.

Figure 3:
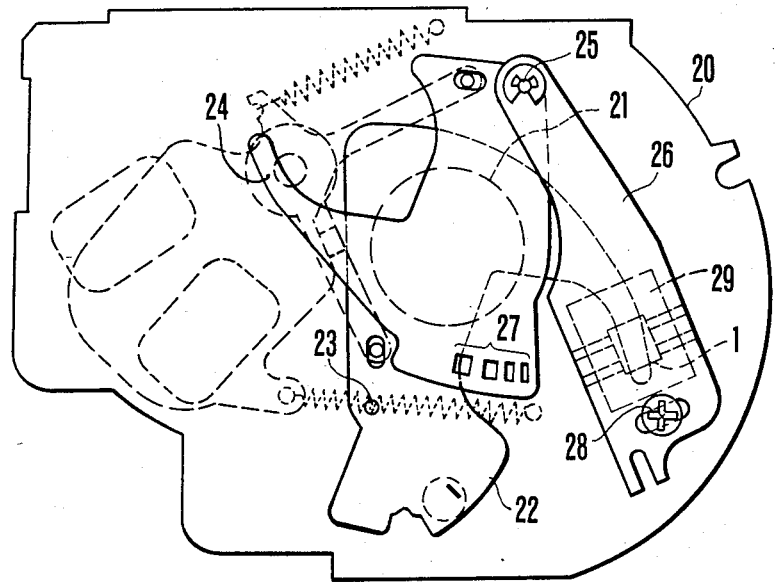
FIG. 3 is an elevational view of a shutter with inclusion of the photo-interrupter of FIG. 2.

FIG. 3 illustrates the construction and arrangement of the shutter blades and the aperture detector interrupter. The shutter blades 22 and 24 are pivotally mounted on respective pins 23 and 25 which are fixedly mounted to a base plate 20. Also pivotally mounted on the pin 25 is a photo-interrupter adjusting member 26. This member 26 is held at such a height as not to interfere with the shutter blades 22 and 24 and is normally fixedly secured to the base plate 20 by a fastener screw 28. This photo-interrupter adjusting member 26 fixedly carries the photo-interrupter 1. The photo-interrupter 1 faces at a reflection surface 29 of the base plate 20. The shutter blades 22 and 24 pass through a space between the photo-interruper 1 and the reflection surface 29. An operating mechanism for the shutter blades 22 and 24 is not shown here.

In the illustrated position, the shutter blades 22 and 24 define no aperture opening, and the tip of the shutter blade 22 covers the front surface of the photo-interrupter 1. As the shutter blades 22 and 24 start to turn in a counter-clockwise direction from this position, the tip of the shutter blade 22 first moves away from the front of the photo-interrupter 1. As they further turn, when the minimum size of aperture opening defined by the blades 22 and 24 is reached, the right hand edge of the first one of the slits 27 counting from the right in the shutter blade 24 passes across the front surface of the photo-interrupter 1, causing the output of the photo-interrupter 1 to change. Thus, each time one of the edges of the successive slits is sensed, the output of the photo-interrupter 1 changes, representing one of the aperture values in half-stop increments.

Figure 4:
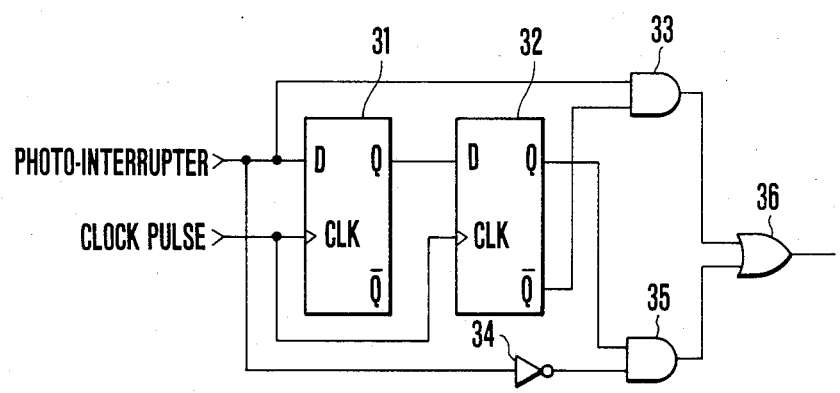
FIG. 4 is an electrical circuit diagram of a practical example of the aperture pulse output circuit of FIG. 2.

FIG. 4 illustrates the construction and arrangement of the elements of the aperture pulse output circuit 2 of FIG. 2. Waveforms of signals appearing at the various points of the circuit of FIG. 4 are shown in FIGS. 5(a) to 5(h). A first D type flip-flop 31 (hereinafter abbreviated as D-FF) has a D-input terminal connected to the output of the photo-interrupter 1 shown in FIGS. 2 and 3, and a Q-output terminal connected to the D-input terminal of a second D-FF 32. The clock pulse input terminals of D-FFs 31 and 32 are connected to the output of a common clock pulse generator (not shown). This clock pulse train has, as shown in FIG. 5(b), a far higher frequency than that of the pulses from the photo-interrupter 1 to the D-input terminal of D-FF 31. An AND gate 33 has two inputs connecred to the output of the photo-interrupter 1 and the $\overline{Q}$-output of the D-FF 32 respectively and produces one pulse for every one of the rising edges of the pulses from the photo-interrupter 1. A second AND gate 35 has two input connected to the output of an inverter 34 of which the input is connected to the output of the photo-interrupter 1 and the Q-output of the D-FF 32 respectively, and produces one pulse for every one of the falling edges of the pulses from the photo-interrupter 1. The outputs of the first and second AND gates 33 and 35 are connected to respective inputs of an OR gate 36. The Q-output and $\overline{Q}$-output of the D-FF 32 are shown in FIGS. 5(c) and 5(d) respectively, the output of the inverter 34 in FIG. 5(e), the output of the AND gate 3 in FIG. 5(f), the output of the AND gate 35 in FIG. 5(g), and the output of the OR gate 36 in FIG. 5(h). The numerical values in this pulse timing chart represent the aperture values occurring in this order from left to right, as the size of aperture opening of the shutter is increasing.

It should be recognized that for each of the rising and falling edges of the pulses from the photo-interrupter 1 to the D-input terminal of the first D-FF 31, the OR gate 36 produces one pulse of which the duration is longer than the period of the clock pulse train, but shorter than two times that period. If the waveform of the output of the photo-interrupter 1 is not so sharp as shown in FIG. 5(a), there will be only need to use a Schmit trigger circuit in the input stage of the D-FF 31, as is well known. In connection with CS in the chart it is noted that when a count switch is moved from a position where an auxiliary diaphragm is closed, the change of the output of the photo-interrupter 1 from H to L level is sensed by the D-FF 31, and, at this time, the OR gate 36 produces a first pulse irrelevant to any aperture value (hereinafter referred to as "count switch (CS " pulse).

Figure 6:
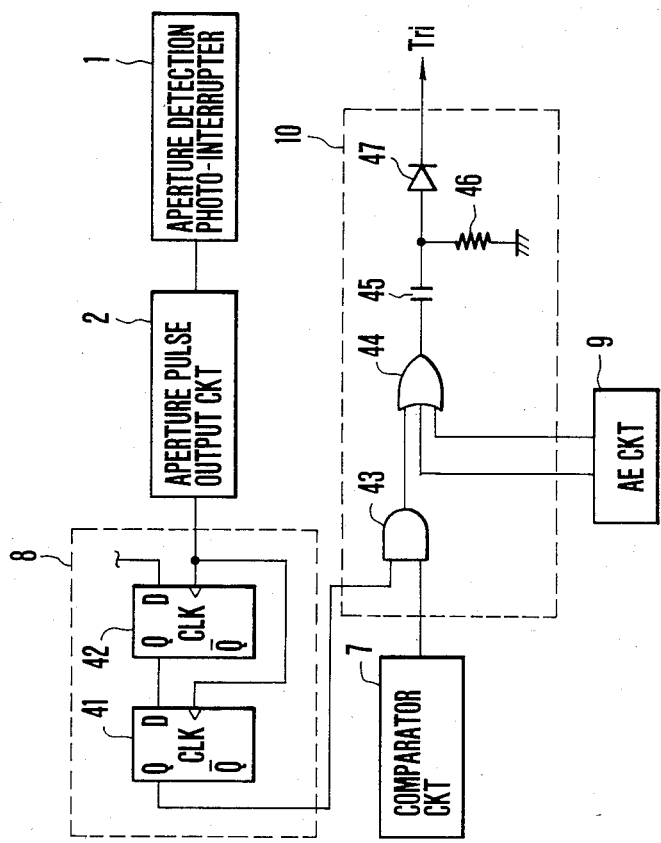
FIG. 6 illustrates the details of the latch circuit and the trigger signal output circuit of FIG. 2.

FIG. 6 illustrates the details of the latch circuit 8 and the trigger signal output circuit 10 shown in FIG. 2. The latch circuit 8 comprises two D-FFs 41 and 42, with their clock pulse input terminals connected to the output of the aperture pulse output circuit 2. The D-input terminal of the D-FF 42 is connected to an electrical power source. The D-input terminal of the D-FF 41 is connected to the Q-output terminal of the D-FF 42. The Q-output of the D-FF 41 is the output of the latch circuit 8. The trigger signal output circuit 10 comprises an AND gate 43 having two inputs connected to the outputs of the latch circuit 8 and the comparator circuit 7 respectively, an OR gate having three inputs connected to the output of the AND gate 43 and the two outputs of the AE circuit 9 respectively, a capacitor 45, a resistor 46 and a diode 47. The capacitor 45 and the resistor 46 constitute a differentiation circuit responsive to variation with time of the output of the OR gate 44 for producing an output pulse of short duration. Of this pulse, the positive going portion only is allowed to pass through the diode 47 to an outlet of the trigger signal output circuit 10.

In operating the circuits 8 and 10, when the electrical power source is thrown, the D-input of the D-FF 42 becomes H level. Responsive to the rising edge of the CS pulse from the aperture pulse output circuit 2, the D-FF 42 then changes its Q-output to H level. This output of H level is applied to the D-FF 41. In synchronism with the rising edge of the second pulse representing the minimum size of aperture opening from the aperture pulse output circuit 2, the Q-output of the D-FF 41 changes to H level. That is, the latch circuit 8 now produces an output of H level. After this, therefore, determination of when the output of the AND gate 43 becomes H level is made dependent on the output condition of the comparator circuit 7. It should be recognized that the use of the latch circuit 8 provides assurance that the flash lighting by the trigger pulse is synchronized with at least the minimum size of aperture opening of the shutter, even if the output of the comparator circuit 7 takes H level from the start before the shutter is opened at any rate. In the latter case, therefore, it is at a point in time when the output of the latch circuit 8 becomes H level (as the shutter is opened to the minimum size of aperture, when this is detected) that the output of the AND gate 43 takes H level. Responsive to this, the OR gate 44 changes its output to H level. This change is transformed to a triggering pulse by the differentiation circuit as has been described above.

This is valid also when either of the outputs of the AE circuit 9 changes from low to high level, representing either the termination of the exposure, or the interruption of the period of actuation of the shutter.

As a result, the flash lighting is synchronized with whichever first of the aforementioned three inputs of the OR gate 44 changes from L to H level.

FIGS. 7(a) to 7(c) illustrate examples of functions to operate the apparatus of FIG. 2. The decimal numbers for the sensitivity of the used film are each converted to a 4-bit binary number by the film sensitivity input circuit 3, as shown in FIG. 7(a). The four information bits are then parallel preset in up to the 4th bit counting from the least significant bit in the counter 4. In FIG. 7(c), the binary coded decimal numbers in the first column for the values of the object distance in the second column are memorized one at a time in the counter within the range finder 5. By factoring the object distance into the guide number of, in this instance, 10 for the film speed of ISO 100, are obtained aperture values in the third column in the form of binary coded decimal numbers in the fourth column by the decoder 6. The decoder 6 further performs addition of a correction of [00011] to each of the numbers of the 4th column to obtain the reference values for comparison in the last or 5th column. In connection with this correction, it should be explained that because it is in ISO 100 that the guide number takes a value of 10, for which the flash exposure value is computed, this value of ISO 100 corresponds to [0100] from FIG. 7(a). For conformance to the 5-bit coded representation, [0100] is changed to [00100]. Further because it is when the output of the counter 4 reaches a level not just equal to, but higher by one than the reference value, that the output of the comparator circuit 7 changes to H level, one is subtracted from [00100] to obtain [00011]. This value of correction may be altered to [00100] when the comparator circuit 7 is otherwise constructed so that its output changes to H level when the output of the counter 4 is equal to the reference value.

FIG. 7(b) illustrates the correspondence of the size of aperture opening of the shutter in the aperture value to the number of pulses produced from the circuit 2 in the binary coded decimal form.

As has been described above, according to the present invention, after the ISO information has been set, the aperture pulses for detection of the size of opening of the shutter blades are counted up, thereby it being made possible for only one counter to suffice for computing the value of the film sensitivity in ISO and the aperture value in the number of pulses to determine when the flash lighting is synchronized with the running shutter, while nevertheless permitting the circuitry of the synchronizing apparatus to be simplified in structure and reduced in scale.

Figure 8:
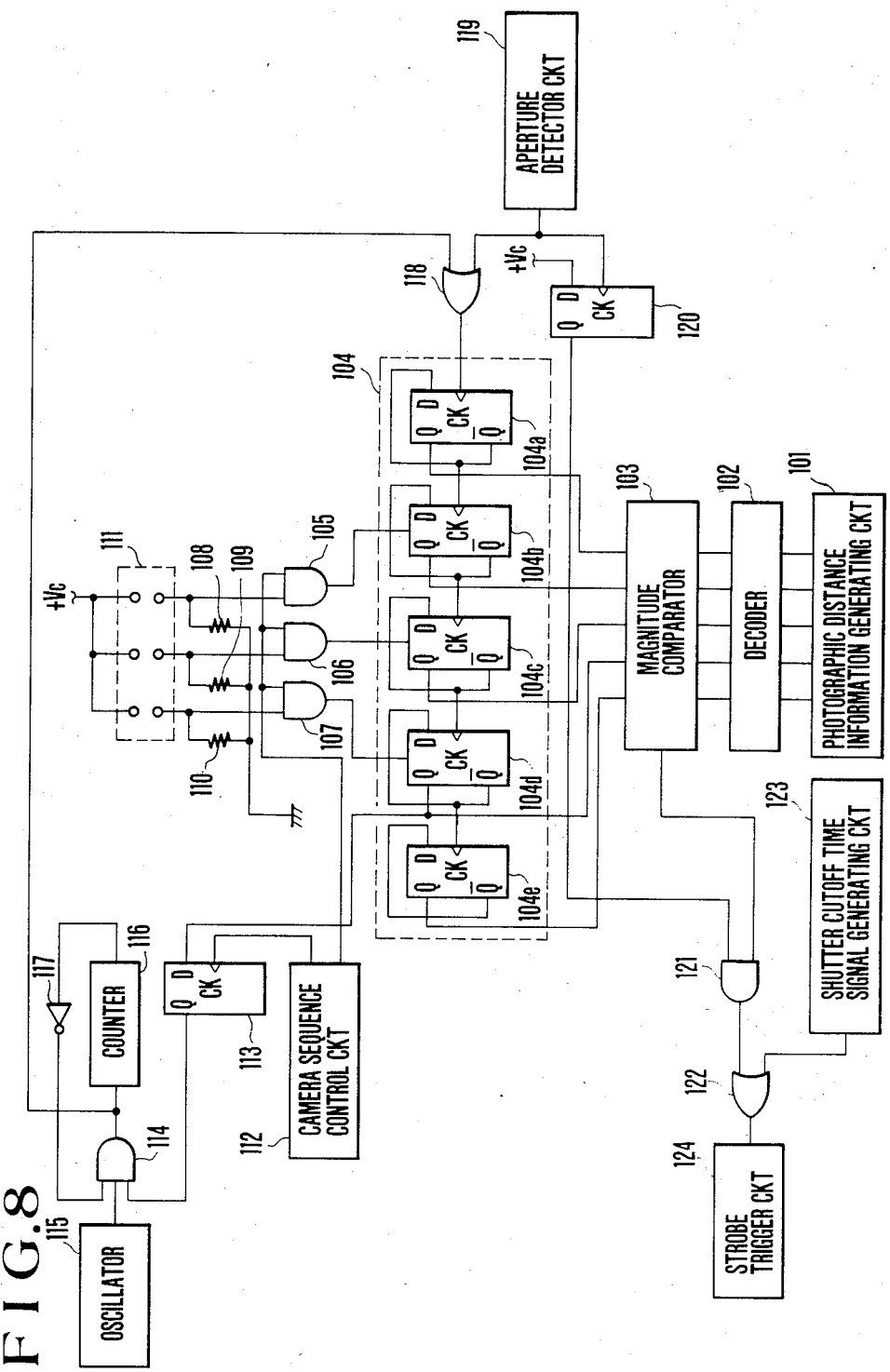
FIG. 8 is an electrical circuit diagram, partly in block form, of another embodiment of the synchronizing apparatus according to the invention.

Another embodiment of the invention is described by reference to FIGS. 8 to 12. In FIG. 8, 101 is a photographic distance information generating circuit, for example, a range finder (not shown) of which the output representing the measured distance from the camera to the object is produced in 4-bit binary coded decimal form with the help of a counter (not shown). This produced distance information is converted by a decoder 102 to such a reference information as a function of the actual object distance, the guide number of the strobe and the particular value of film sensitivity for the guide number. The output of the decoder 102 is compared by a magnitude comparator 103 with the output of a counter 104 which is determined as a function of the present value of the film sensitivity, the altered value of an interchangeable photographic factor, and the actual size of aperture opening, upon coincidence or excess of the latter output with or above the former to produce an output signal of H level for firing the strobe. The counter 104 is a binary counter constructed from five D type flip-flops (hereinafter abbreviated as D-FF) 104a to 104e, the arrangement being such that when two pulses enter the clock pulse input terminal (hereinafter called CK terminal) of the D-FF 104a which produces a least significant bit signal, the output is shifted up by one step. For note, the Q-output terminals of the D-FFs 104a, 104b, 104c, 104d and 104e are connected to the respective input ports of the magnitude comparator 103 in this order from the least significant place.

111 is switch means for sensing the film sensitivity information in accordance with the code provided on the film cartridge loaded in the camera. One contact in each of three pairs is connected to the positive terminal of a battery Vc through a power switch. The opposite contacts are connected through respective pulldown resistors 108 to 110 to the circuit earth. AND gates 105 to 107 have their one inputs connected to the respective junctions between the switch means 111 and the resistors 108 to 110, and their other inputs connected to a common output of a camera sequence control circuit 112. The outputs of AND gates 105 to 107 are connected to the D-FFs 104b to 104d respectively so that only when the camera sequence control circuit 112 produces a signal of H level, the film sensitivity information of the code on the film cartridge enters the counter 104.

A circuit for correcting the aperture value at which the flash lighting is synchronized with the shutter in accordance with alternation of the value of an exposure factor, for example, the amount of flash light emitted, as the sensitivity of the used film is so high, includes a D-FF 113 having a D-input terminal connected to the Q-output terminal of the D-FF 104d of the counter 104. When this Q-output is H level, that is, when the film sensitivity is very high, one pulse from the camera sequence control circuit 112 to the CK terminal of the D-FF 113 causes its Q-output to change to H level representing the introduction of a correction. A counter 116 can be manually set to a maximum number of pulses to count. When the number of pulses counted reaches the set maximum value, the counter 116 produces an output signal of H level which is fed back to the input thereof through an inverter 117 and an AND gate 114.

The other two inputs of the AND gate 114 are connected to the output of an oscillator 115 and the Q-output of the D-FF 113 respectively.

The output of the AND gate 114 is applied not only to the input of the counter 116 but also to the CK-terminal of the D-FF 104a of the counter 104 through an OR gate 118, so that the correction-for-alternation information enters the counter 104. An aperture detector circuit 119 produces a corresponding number of pulses to the size of aperture opening defined by the running shutter blades and detected by a photo-interrupter in cooperation with the slits provided in the shutter blade. These aperture pulses are applied through the OR gate 118 to the CK-terminal of the D-FF 104a of the counter 104 so that the aperture information enters the counter 104.

120 is a D-FF in which the fact that the shutter has been opened to the minimum size is latched to produce a signal representing the allowance for firing the strobe at the Q-output terminal thereof. Its D-input terminal is supplied with an input of H level when the circuit is rendered operative, and its CK-terminal is supplied with the aperture pulses from the aperture detector circuit 119. An AND gate 121 receives the Q-output of the D-FF 120 and the output of the magnitude comparator 103. When the shutter opens to at least the minimum size, and when the output of the magnitude comparator 103 changes to H level, therefore, the AND gate 121 produces an allowance signal of H level for actuating a strobe trigger circuit 124 to fire which is applied through an OR gate 122 to the strobe trigger circuit 124. A shutter cutoff time signal generating circuit 123 is constructed with a counter and the like, and starts to count at the same time when an exposure of the film is initiated. In a prescribed time, it produces an output of H level which is applied through the OR gate 122 to the strobe trigger circuit 124. This has, despite the output of the magnitude comparator 103 does not become H level even after all the pulses have been produced from the aperture detector circuit 119 as the shutter has fully been opened, to fire the strobe at the termination of duration of the prescribed time set in the shutter cutoff time signal generating circuit 123.

For note, when the shutter is closed, the battery circuit is cut off. Then when the shutter release button is pushed down to a first stroke, the battery is thrown again, thereby the circuit of FIG. 8 is reset to the initial state by a power-up clear circuit (not shown).

FIGS. 9(a), 9(b) and 9(c) are numerical specific examples of the film sensitivity information, the aperture pulse dependent aperture information and the distance information respectively, usable in the synchronizing apparatus of FIG. 8. Here, FIG. 9(a) illustrates the Q-outputs when the film sensitivity information is set in the counter 104; FIG. 9(b) illustrates the relationship between the number of aperture pulses counted from the start of opening of the shutter blades (the binary system) and the aperture value; and FIG. 9(c) illustrates the 4-bit informations at the output of the photographic distance information generating circuit 101 in the first column counting from the left, the 5-bit informations at the output of the decoder 102 in the central column, and the actual values of the distance from the camera to the object to be photographed in the last column. For note, the reference informations produced from the decoder 102 is obtained by dividing the guide number of the strobe by the effective object distance and adding to the results or the aperture values in the form of the pulse numbers of FIG. 9(b) a standard film sensitivity information, for example, if ISO 100, then [00100]. In this instance, the guide number is taken at 10, and the standard film sensitivity at ISO 100, for which the decoder produces the output.

Next, by reference to FIGS. 8 and 9(a) to (c), the operation of this embodiment is described. When the release button is pushed down to the first stroke, the synchronizing apparatus of FIG. 8 is reset. Then, the camera sequence control circuit 112 gives one pulse of H level to the AND gates 105 to 107, thereby the film sensitivity information corresponding to the code on the film cartridge is preset in the D-FFs 104b to 104d of the counter 104. It is to be noted here that the reason why the film sensitivity information is not preset in the D-FF 104a is, as is obvious upon seeing FIGS. 9(a) to 9(c), that in the case of this embodiment, the film sensitivity information in one step increments are put into the counter 104, while the aperture information in half-step increments is put from the aperture detector circuit 119 to the counter 104. Also the decoder 102 produces the distance information in half-step increments. Thus, the magnitude comparator 103 is allowed to operate with the accuracy of half-steps.

Now assuming that the film sensitivity information is ISO 400, then the left hand pair of contacts of the switch means 111 are short-circuited by the code of the cartridge (not shown). Of the AND gates 105 to 107, therefore, only the AND gate 107 produces an output of H level. This signal is preset in the D-FF 104d, and its Q-output becomes H level (while the Q outputs of the other D-FFs 104a, 104b, 104c and 104e are L level).

After the film sensitivity information has been preset in the counter 104, the camera sequence control circuit 112 then gives another output of changing from L to H level (for, as the preset value of a photographic factor, for example, the guide number of the strobe, has been altered, the counter for correction of the time of synchronization is rendered operative only when the necessity of such correction arises, in the instance of FIG. 8) to the CK-terminal of the D-FF 113. With the D-input of the D-FF 113 previously set in H level, or the Q-output of the D-FF 104d for the preset film sensitivity information in H level (namely, ISO 400, or ISO 800), therefore, it is at this time that the Q-output of the D-FF 113 changes to H level. Since the AND gate 114 is given this signal and the output of H level from the inverter 117, a train of clock pulses from the oscillator 115 starts to enter the counter 116. When the number of clock pulses counted reaches the value previously set in the counter 116, the output of the counter 116 changes to H level. This is applied through the inverter 117 as L level to the AND gate 114 so that no more clock pulses from the oscillator 115 enter the counter 116.

The same number of clock pulses as that of clock pulses applied to the counter 116 are counted up by the counter 104 through the OR gate. Therefore, if it is desired to increase the content of the counter 104 by two steps, because the weight of counting of the D-FF 104a is a ½ step, for four pulses are given to the CK-terminal of the D-FF 104a, the operator needs only to set the counter 116 at 4 as the maximum count value.

Alternatively assuming that to allow for use of high speed film, from the standpoint of saving electrical energy, the amount of flash light to be emitted from the strobe has to be decreased by two steps, then it is required to decrease the content of the counter 104 by two steps so that this change is compensated for. In this case, from the complementary relationship, as the conter 104 has five stages, what value to be set in the counter 116 is found to be $2^5-4$, or 28.

Taking a numerical example, for the film sensitivity of ISO 400, the content of the counter 104 first takes [01000]. Then, when 28 clock pulses have been counted up, its content becomes [00100], being equal to that for ISO 100. This implies that the size of aperture opening is increased by two steps, as is resulted from the decrease of the content of the counter 104 by two steps. In this case, the correction for the altered value of the exposure factor can be realised by setting the counter 116 at the maximum count value of 28.

Meanwhile, the distance information is produced from the photographic distance information generating circuit 1, and, after having been converted by the decoder 102 as shown in FIG. 9(c), is applied to the magnitude comparator 103.

Upon further depression of the release button to the second stroke, the shutter blades starts to move in a direction to open. When the aperture detecting circuit 119 produces a first pulse representing the maximum aperture value of 16, or at a time when the input at the CK-terminal of D-FF 120 rises from L to H level, the Q-output of the D-FF 120 changes to H level. Also the aperture pulses from the circuit 119 are applied through the OR gate 118 to be counted up by the counter 104. This ever-changing content of the counter 104 is given to the magnitude comparator 103, being compared with the reference information from the aforementioned decoder 102. When the content of the counter 104 coincides, or exceeds, with or above the distance information of the decoder 102, the magnitude comparator 103 produces an output of H level. Since, at this time, the AND gate 121 receives this signal along with the signal of H level from the D-FF 120, it produces an output of H level which is then applied through the OR gate 122 to the strobe trigger circuit 124. As this is actuated, the strobe (not shown) is fired.

For note, if the magnitude comparator 103 does not produce an output of H level even after all the aperture pulses have been produced from the aperture detecting circuit 119 as the shutter has been fully opened, then the shutter cutoff time signal generating circuit 123 produces an output of H level in the prescribed time from the time of depression of the release button to the second stroke, by which the strobe is fired through the OR gate 122 and the strobe trigger circuit 124.

For example, here, an explanation will be made by taking a numerical example. On assumption that the film of ISO 400 is used, the amount of flash light to be emitted is altered down by two steps with decrease in the content of the counter 104 from [01000] by two steps to [00100] as has been mentioned above, and the distance from the camera to the object to be photographed is 2.0 meters, then the output of the decoder 102 becomes [01100]. Therefore, as the shutter is opening, when the aperture value of 4.7 is reached, or when the nine pulses from the start of operation of the shutter blades, or the content of [01000] is added by the aperture pulses to the aforementioned content of [00100] in the counter 104, the total sum of the counted values becomes [01100], being coincident with the output of the decoder 102, thereby the allowance signal (H level) for firing the strobe is produced from the magnitude comparator 103.

It is to be noted that as the counter 104 use may be made of an Up/Down counter with an advantage that the correction can be set by a smaller number of pulses as counted down.

Another example of modification is that the D-input terminal of the D-FF 113 is connected not to the Q-output of the D-FF 104d, but to that output of the switch means 111 which is connected to the input of the AND gate 107.

Figure 10:
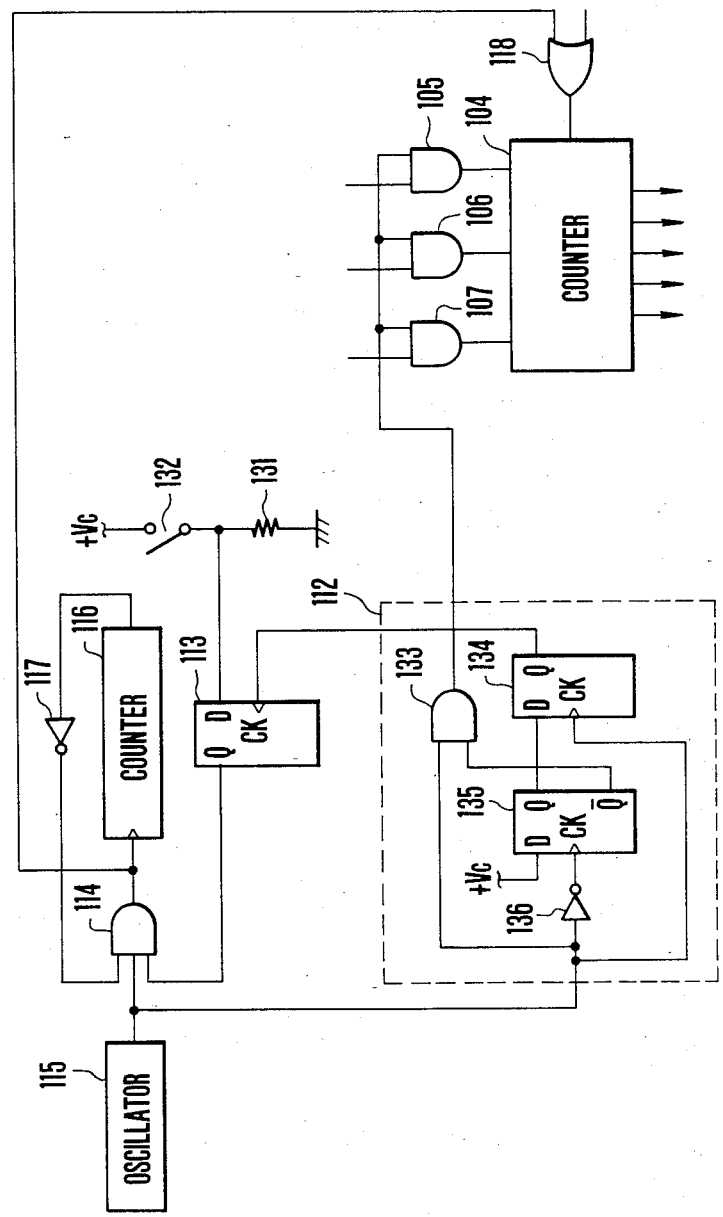
FIG. 10 is an electrical circuit diagram of an example of modification of the circuit of FIG. 8 with portions omitted.

FIG. 10 illustrates an example of variation of the circuit of FIG. 8 wherein the same reference characters have been employed to denote the similar parts to those shown in FIG. 8. A pull-down resistor 131 is connected in series to a switch 132 for setting a correction for the altered value of a photographic factor such as the focal length, the amount of flash light energy, or the exposure correction factor. One of the two contacts of the switch 132 is connected to the positive terminal of a battery, and the other contact is conected to the pull-down resistor 131 and also to the D-input terminal of the D-FF 113. The camera sequence control circuit within a dashed line block 112 comprises a first D-FF 135 having a CK-terminal connected through an inverter 136 to the output of the oscillator 115 and a D-input terminal connected to the positive terminal +Vc of the battery, an AND gate 133 having two inputs connected to the output of the oscillator 115 and the $\overline{Q}$-output terminal of the D-FF 135, and an output connected to the inputs of the AND gates 105 to 107, and a second D-FF 134 having a CK-terminal connected to the output of the oscillator 115, a D-input terminal connected to the Q-output of the D-FF 135, and a Q-output terminal connected to the CK-terminal of the D-FF 113. The other constituent elements are similar to those shown in FIG. 8, and their illustration is omitted from FIG. 10.

When the release button is pushed down to the first stroke, the electrical power source is thrown to this circuit and the circuit is set in the initial state. Here, the $\overline{Q}$ output of the D-FF 135 is H level, and the AND gate 133 responsive to the first clock pulse from the oscillator 115 produces an output of H level. As has been described above, therefore, the film sensitivity information is transferred to the counter 104. At a point in time when the first clock pulse falls, or when the pulse at the CK-terminal of the D-FF 135, because of the application of the first clock pulse through the inverter gate 136 thereto, rises, the $\overline{Q}$ output of the D-FF 135 becomes L level, causing the output of the AND gate 133 to become L level and therefore causing all the outputs of the AND gates 105 to 107 to become L level. Thus the entrance of the film sensitivity information into the counter 104 is cut off. Also, because the Q output of the D-FF 135 becomes H level, at another point in time when the second clock pulse from the oscillator 115 rises, the Q output of the D-FF 134 changes to H level.

If the photographer has already turned on the switch 132 to correct for the alternation of the value of the photographic factor, then the D-input of the D-FF 113 is H level. At the point in time when the Q output of the D-FF 134 rises to H level, therefore, the Q output of the D-FF 113 becomes H level. Thereby, as has been described above, the corrected count number is counted by the counter 116 to perform the correction of computation of the electrical FA. The subsequent procedure is exactly the same as that described in connection with FIG. 8, and, therefore, is no more explained here. In the case of this embodiment, there is an advantage that the correction for the alternation of the value of the photographic condition to the desire of the photographer can be introduced independently of the film sensitivity.

Figure 11:
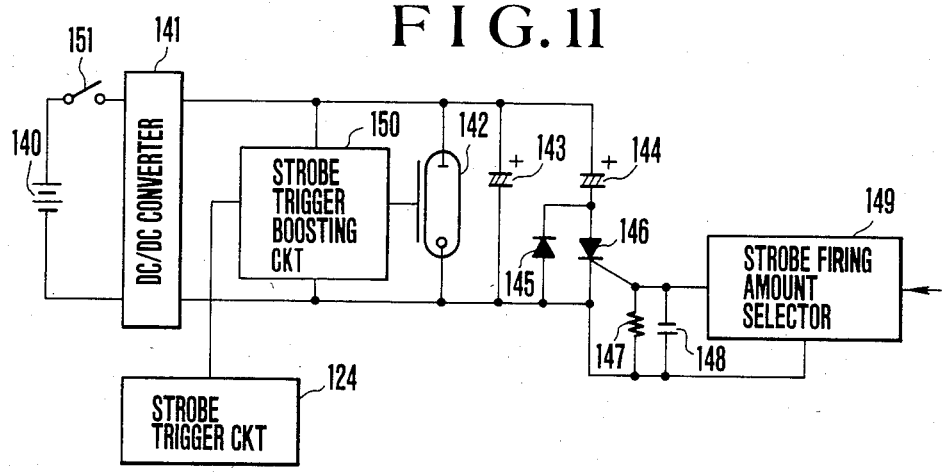
FIG. 11 is an electrical circuit diagram of a firing circuit capable of varying the amount of flash light emitted.

FIG. 11 illustrates the circuitry of a strobe capable of changing the amount of flash light, including an electrical power source or battery 140, a DC-DC converter 141, a xenon discharge tube 142, a first capacitor 143, a second capacitor 144, a discharging diode 145, a charging control thyristor 146, a resistor 147, a capacitor 148, a strobe firing amount selector 149, a strobe trigger boosting circuit 150 and a switch 151. For note, as the actuating signal for the strobe firing amount selector 149, use many be made of, for example, the output of an inverter (not shown) of which the input is connected to the junction between the resistor 110 and the input of the AND gate 107 of FIG. 8, or the inverted signal from the output of the switch 132 of FIG. 10. If the switch 132 is ON, or the film sensitivity is not less than ISO 400, the potential at this junction point becomes H level. Responsive to this, the strobe firing amount selector 149 produces an output of L level which is applied to the gate of the thyristor 146, therby the thyristor 146 is turned off. Alternatively, if the switch 132 is OFF, or the film sensitivity is not more than 200, the potential at this junction point becomes L level. Responsive to this, the strobe firing amount selector 149 produces an output of H level which is then applied to turn on the thyristor 146.

When the switch 151 is turned on, the battery 140 is connected to the DC-DC converter 141, thereby a D.C. high voltage is supplied to the strobe trigger boosing circuit 150, the xenon tube 142, and the first capacitor 143. With the strobe firing amount selector 149 when producing an output of H level the thyristor 146 is in conducting state. Therefore, the second capacitor 144 too is given the output of the DC-DC converter 141 and is charged. As a result, the amount of flash light to be emitted is equal to the sum of the capacitances of the first and second capacitors 143 and 144. Conversely when the output of the strobe firing amount selector 149 is of L level, the thyristor 146 is non-conducting, so that the second capacitor 144 is not charged. The amount of light to be emitted is therefore, determined by the capacitance of the first capacitor 143. A resistor 147 and a capacitor 148 function to prevent an error signal from entering the gate of the thyristor 146. Now, the ratio of the capacitances of the first capacitor 143 to the second capacitor 144 is assumed to be 1:3. Then the ratio of the flash light amount when the thyrstor 146 is ON to that when OFF is found to be 1:4. Thus they are differentiated by two steps.

The strobe firing amount selector 149 responsive to the film sensitivity information, for example, ISO 400 or more, turns off the thyristor 146 so that the amount of flash light emitted is decreased by two steps from that for ISO 100. Despite this, because the film sensitivity of ISO 400 is higher by two steps than that of ISO 100, though the flash exposure value is the same, as the ambient light is the same, the difference between the brightnesses of the subject and the environment is decreased so that a clearer photograph can be taken. Also, this leads to reduce the consumption of energy of the battery.

Also, besides the method of selecting the flash light amounts of the strobe in automatic response to the film sensitivity, it is also possible to employ another method of independent selection in response to the other photographic condition.

By the invention, it is made possible to introduce the computation for the change of the strobe firing amount into the computation of the timing of the firing of the flash-shot synchronizing technique which has so far carried out the computation under the condition that the amount of flash light emitted from the strobe is constant.

Figure 12:
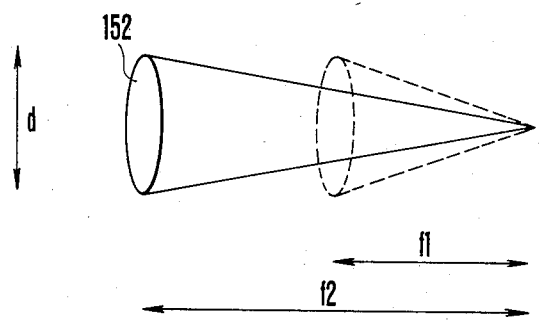
FIG. 12 is a schematic view illustrating the variation of the F-number at the full open aperture with variation of the focal length.

FIG. 12 schematically illustrates the variation of the aperture value at full open with the variation of the focal length. Letting f1 denote the shorter focal length and "d" the diameter of the entrance pupil of the lens 152, the F-number at full open aperture becomes f1/d. When the focal length is changed to a longer one, say, f2, the full open F-number changes to f2/d. If the ratio of the two focal lengths is taken at f1:f2=1:2, it follows that the full open F-number changes two times. In other words, the full open aperture value proportional to the full open F-number is changed by two steps. Such change in the full open aperture value results in that all the aperture values sensed by the aperture detector on the shutter blade are shifted from the actual ones. To compensate for this, the aforementioned computation of the flash-shot synchronizing technique must be corrected by this shift amount so that the detected aperture value coincides with the actual one. This can be done in a similar manner to that described in connection with the alternation of the flash light amount of the strobe.

For example, with the standard focal length taken as the start point, for the telephoto setting, the correction by two steps is required. For this purpose, the switch 132 of FIG. 10 may be arranged to cooperate with a focal length selector on the lens barrel. For example, the movable contact of the switch 132 is borne on a movable lens holder, while the fixed contact is mounted to the body tube in which the lens holder is fitted so that when the lens holder is in the telephoto position, both contacts of the switch are closed.

As has been described about the present invention, the circuit for carrying out the electrical flash auto is provided with means rendering it possible to correct the aperture value at which the flash lighting is automatically synchronized with the running shutter in accordance with alternation of the value of an exposure factor such as the flash light amount, or the focal length of the photographic lens so that a correct flash exposure can always be made.

Figure 13:
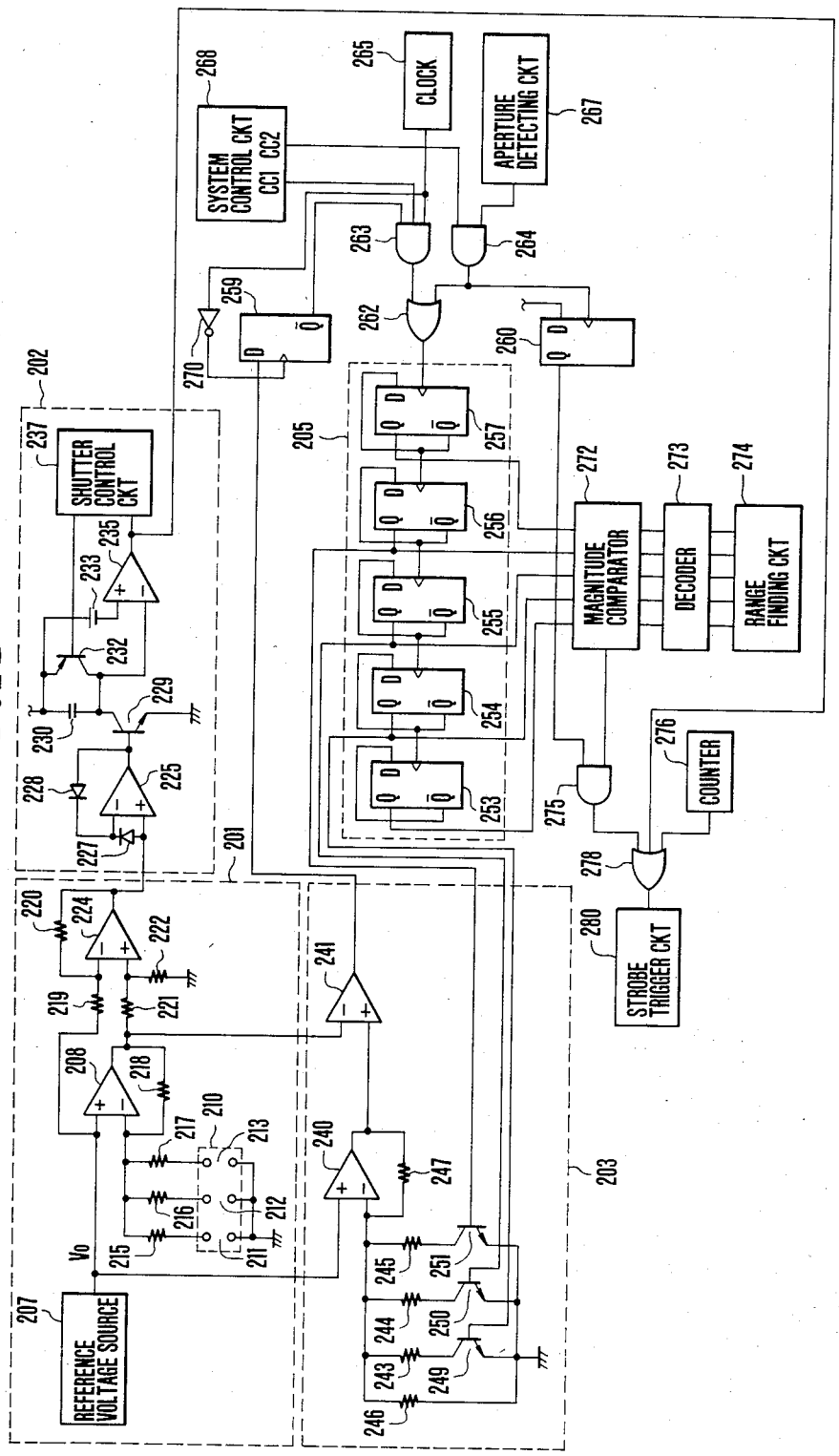
FIG. 13 is an electrical circuit diagram of still another embodiment of the synchronizing apparatus according to the invention.

Next, still another embodiment of the invention is described by reference to FIGS. 13 to 15. The circuit of FIG. 13 includes a film sensitivity analog input circuit 201, an analog AE circuit 202, an analog/digital converter circuit 203 and a counter 205. In the sensitivity input circuit 201, there is a known reference voltage circuit 207 for producing an output in the form of a voltage V0 having a coefficient of absolute temperature T. Operational amplifiers 208 and 224, resistors 215 to 222, and an analog switch 210 receptive of the digital code of film sensitivity for producing an analog output and having three pairs of contacts 211, 212 and 213. The AE circuit 202 comprises an operational amplifier 225, a photosensitive element SPC 227, a compression diode 228, an expansion transistor 229, an integration capacitor 230, a discharging transistor 232, a reference voltage source 233, a comparator 235, and a shutter control circuit 237. The A/D converter circuit 203 comprises an operational amplifier 240, a comparator 241, resistors 243 to 247, and transistors 249 to 251 constituting analog switches. A circuit for computing the timing of firing the strobe comprises the counter 205 of five D-FFs 253 to 257, D-FFs 259, 260, OR gates 262 and 278, AND gates 263 and 264, a clock 265, an aperture detecting circuit 267, a magnitude comparator 272, a distance-aperture decoder 273, a range finding circuit 274 for producing an output representing the distance from the camera to the object to be photographed, an AND gate 275, a shutter cutoff time counter 276, and strobe trigger circuit 280. 268 is a portion of a system control circuit of the camera.

A cartridge of film (not shown) has electrically conductive phatches in corresponding positions to the contacts 211 to 213 of the analog switch 210 as indicated in the table of FIG. 14A. The analog switch 210 because its having three pairs of contacts reads the first three significant bits (weighted 4, 2, 1). Therefore, the mark (*) headed values in the table are selectively read in.

The operation of the above-described circuit is as follows: The voltage V0 from the reference voltage circuit 207 is applied to the non-inverting input terminal of the operational amplifier 208. The ratio of the resistance values of the resistors 215, 216 and 217 is $\frac{1}{4}:\frac{1}{2}:1$ respectively. At the contacts 211, 212 and 213 there appear potentials S11, S12 and S13 respectively of binary value "1" or "0" when the contacts in the pair are closed or opened respectively depending on the presence or absence of the conductive patch on the film cartridge. Letting R17 denote the resistance value of the resistor 217, R18 that of the resistor 218, an equation for the output V08 of the operational amplifier 208 may be expressed as:

$$V08 = V0 + (4S11 + 2S12 + S13)(R18/R17)V0 \quad (1)$$

By the operational amplifier 224 and the resistors 219 to 222 of values R19 to R22 respectively where R19=R21 and R20=R22, the value of V08 is corrected to the following value V024.

$$V024 = (4S11 + 2S12 + S13)(R18/R17)(R20/R19)V0 \quad (2)$$

Putting $(R18/R17)(R20/R19)V0 = (kT/q)\ln 2$ where T is the absolute temperature, "k" is Boltzmann's constant, and "q" is the charge of electron, we have $$V024 = (4S11 + 2S12 + S13)(kT/q)\ln 2 \quad (3)$$

The AE circuit is of known construction. Letting Is denote the photo-current flowing to the SPC 227, and Ic the current flowing to the collector of the expansion transistor 229, the following equation is established by the diode 228, operational amplifier 225 and transistor 229:

$$Ic = Is \times 2^{(4S11 + 2S12 + S13)} \quad (4)$$

From equation (4), it is to be understood that the Ic can vary in one step increments as a function of the film sensitivity in the digital codes as shown in the table. Thus, the film sensitivity is automatically put as an analog value to the AE circuit 202.

Meanwhile, in the A/D converter circuit 203, the operational amplifier 240 corresponds to the operational amplifier 208 of the analog input circuit 201. Also the resistors 243, 244, 245 and 247 of which the resistance values are R43, R44, R45 and R47 respectively corresponds the resistors 215, 216, 217 and 218, and the transistors 249, 250 and 251 to the contacts 211, 212 and 213 of the analog switch 210 respectively. The resistance value of the resistor 246 is equal to two times that of the resistor 245. When the transistors 249, 250 and 251 turns on, neglecting the saturation voltage across the collector-emitter path, an equation for the output voltage V040 of the operational amplifier 240 may be written as $$V040 + V0 + (4ST49 + 2ST50 + ST51 + \tfrac{1}{2})(R47/R45) - V0 \quad (5)$$

where ST49, ST50 and ST51 represent the switching operations of the transistors 249, 250 and 251 respectively, taking 1 or 0 when ON or OFF respectively.

With R47/R45=R18/R13, while the 3-bit binary coded decimal number determined by the binary states of the ST49, ST50 and ST51 is allowed to be changing as [000], [001], [010], [011], ..., [111], the output voltage V08 of equation (2) is compared with the output voltage V040 of equation (5) by the comparator 241. Its output inverts from low to high, when the voltage V040 is higher by a magnitude of the resistor 246. Which of the transistors 249, 250 and 251 are concurrently in ON state correspond to which of the contacts 211, 212 and 213 are in ON state. Thus, the analog ISO value can be digitally set in the counter 205 and can be discriminated. After the film sensitivity ΔSv has been set in the counter 205, aperture pulses Av from the signal on the shutter blades (which also serves as the diaphragm blades) are then added to the content of the counter 205 so that ΔSv+Av is computed. The 4-bit digital distance data produced from the range finding circuit 274 is computed with the ISO value of 25 and the guide number K(K: constant) in passing through the decoder 273 comprised of gates. The decoder 273 produces an output in 5-bit binary coded decimal form representing an aperture value Avo in 0.5 step increments which is then applied to the magnitude comparator 272. When Avo≦ΔSv+Av, the magnitude comparator 272 produces an output of H level which is applied to the AND gate 275.

At first, the counter 205 and the D-FF 259 are reset, and the Q-output of the D-FFs 254, 255 and 256 are L level. Therefore, the transistors 249, 250 and 251 are in OFF state, and the $\overline{Q}$-output of the D-FF 259 is H level. When a signal of H level from the output CC1 of the control circuit 268 is applied to the AND gate 263, the AND gate 263 produces the clock signal of the clock 265 which is applied through the OR gate 262 to the counter 205. As the number of clock pulses is increasing, the Q-outputs of the D-FFs 254, 255 and 256 change, causing the transistors 249, 250 and 251 to turn on and off and therefore causing the output of the operational amplifier 240 to gradually increase. When its output becomes higher than the output of the operational amplifier 208 the comparator 241 inverts from L to H level. The D-FF 259 changes its $\overline{Q}$ output to L level in synchronism with the inverted clock signal by the inverter 270. Thereby, the output of the AND gate 263 is changed to L level, cutting off the supply of the clock signal to the counter 205. The resultant content of the counter 205 corresponds to the film sensitivity. Subsequently, the system control circuit 268 changes its output CC1 to L level and its output CC2 to H level. In synchronism with this, the shutter blades (not shown) start to open. As the signal on the shutter blade is detected by the aperture detecting circuit 267, the obtained aperture pulses are applied through the AND gate 264 and the OR gate 262 to the counter 205 in addition to the value of film sensitivity. Here, because each aperture pulse is obtained for every 0.5 steps, the film sensitivity which takes values in one-step increments is set in the 2nd to 4th stages in the counter 205 which are connected to the transistors 243, 244 and 245, respectively.

As the aperture pulses beginning with that representing the minimum size of aperture opening enter successively, when the content of the counter 205 exceeds the value of the decoder 273, a signal of H level is applied through the AND gate 275 and OR gate 278 to the strobe trigger circuit 280, thereby the strobe is fired. Another input of the AND gate 275 is connected to the Q output of the D-FF 260. The D-FF 260 responsive to the first pulse of the minimum size of aperture changes its Q output to H level. This has, despite at a point in time when the film sensitivity is set in the counter 205, the content of the counter 205 already exceeds the value of the decoder 273, to prevent the strobe from being fired by the output of H level from the magnitude comparator 272. Another input terminal of the OR gate 278 is connected to the output of the comparator 235 of the analog AE circuit 202 so that when the termination of the exposure occurs earlier than the output of the AND gate 275, the strobe is caused to fire in synchronism with the start of closing of the shutter. Still another input terminal of the OR gate 278 is connected to the output of the counter 276 which counts the shutter cutoff time so that when the computed aperture value is smaller than the minimum (full open aperture), as the magnitude comparator 272 does not produce the output of H level, the strobe is fired at the cutoff time.

FIG. 14B(a) shows the states of the various outputs of the counter 205 when the film sensitivities of the digital codes of the film cartridge are set therein. Of the outputs Q53–Q57 of the D-FFs 253–257 of the counter 205, the outputs Q54–Q56 correspond to the *-marked digital codes of FIG. 14A. FIG. 14B(b) shows the correspondence of the ordinal numbers of the pulses obtained from the shutter blade to the aperture values, the corresponding cardinal numbers being counted by the counter 205.

FIG. 14B(c) shows the digital representations of the distances (in meter) to the object of the range finding circuit 274 along with the optimum aperture values for ISO 25 and the guide number of 10 in relation to what aperture values in FIG. 14B(b). Said digital values correspond to the outputs of the decoder 273 and also to the various outputs of the counter 205.

In the above-described embodiment, the ISO values of the film sensitivity are in one-step increments and the first three places of the film sensitivity of FIG. 14A are read. But, the last two places of the film sensitivity, that is, ⅓ step increments may be read.

Also, in the analog input circuit 201, code contacts for the ⅓ step and ⅔ step and resistors related thereto are added to the analog switch 210.

Figure 15:
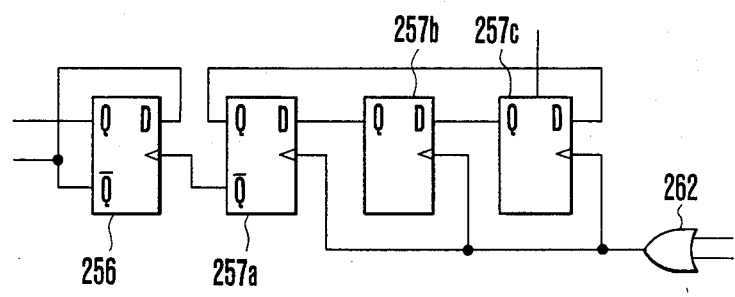
FIG. 15 is an electrical circuit diagram of an example of modification of the periphery of the counter of FIG. 13.

FIG. 15 is a practical example of that. The first D-FF 257 of the counter 205 of FIG. 13 is replaced by a 3-stage shift register comprising D-FFs 257a to 257c. Presetting is made so that in the initial state the Q output of the D-FF 257c becomes H level. The other D-FFs 253–256, 257a and 257b are left reset. Then, the D-FFs 256, 257a and 257b become possible to produce outputs weighted for 1 step, ⅔ step and ⅓ step respective at their Q-output terminals. Also added to the A/D converter circuit 203 too are transistors and resistors corresponding to the analog switch, and the resistor 246 is adjusted to a value for 1/6 step.

For note, in application to the camera having the zoom lens, the variation with zooming of the full open aperture value has to be introduced into the film sensitivity analog input portion of the above-described example of the circuit in such a manner as to be counted up likewise as the digital codes of film sensitivity, thereby it being made possible to achieve proper performance of the exposure control and the strobe auto without changing the circuit.

The A/D conversion of the analog film sensitivity is carried out by using a D/A converter and a counter for controlling it. But, the A/D conversion itself may be otherwise carried out by another prior-known method, for example, an integrator and a counter. The use of this counter in common with that for computing the aperture information is included in the invention.

What is claimed is:

1. A flash control device for flash photography, comprising:
  (a) distance information transfer means for transferring information of distance to an object;
  (b) film sensitivity information transfer means for transfering film sensitivity information;
  (c) aperture information transfer means for transferring aperture opening information;
  (d) flash control means for producing a flash signal for flash photography in response to a predetermined state of an output of said aperture information transfer means relative to an output of said distance information transfer means and an output of said film sensitivity information transfer means; and
  (e) prevention means for preventing said flash signal from being produced by said flash control means until the aperture opening information reaches a predetermined value.

2. A flash control device according to claim 1, wherein said aperture information transfer means includes opening position detection means for detecting an opening position of the aperture.

3. A flash control device according to claim 2, wherein said opening position detecting means includes light detection means.

4. A flash control device according to claim 3, wherein said light detection means includes a photointerrupter.

5. A flash control device according to claim 3, wherein said opening position detection means includes count means for counting rises and descents of the output of said light detection means, and the aperture information transfer means is arranged to detect an amount of opening of the aperture on the basis of the value counted by the count means.

6. A flash control device according to claim 1, which further comprises compensation means for compensating the output of said flash lighting control means in response to changes in photographic conditions.

7. A flash control device according to claim 6, wherein said compensation means includes response means for responding to changes in focal distance.

8. A flash control device according to claim 6, wherein said compensation means includes response means for responding to changes in flash lighting amount of a strobe.

* * * * *